United States Patent
Kang (10) Patent No.: US 12,275,365 B2
(45) Date of Patent: Apr. 15, 2025

(54) VEHICLE AIRBAG

(71) Applicant: HYUNDAI MOBIS CO., LTD., Seoul (KR)

(72) Inventor: Dong Ho Kang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/505,484

(22) Filed: Nov. 9, 2023

(65) Prior Publication Data

US 2024/0409056 A1 Dec. 12, 2024

(30) Foreign Application Priority Data

Jun. 12, 2023 (KR) .......................... 10-2023-0074593

(51) Int. Cl.
| | | |
|---|---|---|
| *B60R 21/231* | (2011.01) | |
| *B60R 21/217* | (2011.01) | |
| *B60R 21/233* | (2006.01) | |
| *B60R 21/2338* | (2011.01) | |
| *B60R 21/237* | (2006.01) | |

(52) U.S. Cl.
CPC ...... *B60R 21/23138* (2013.01); *B60R 21/217* (2013.01); *B60R 21/233* (2013.01); *B60R 21/2338* (2013.01); *B60R 2021/23146* (2013.01); *B60R 2021/23308* (2013.01); *B60R 2021/23386* (2013.01); *B60R 21/237* (2013.01)

(58) Field of Classification Search
CPC .......... B60R 21/23138; B60R 21/2033; B60R 21/2338; B60R 2021/23146; B60R 2021/23308; B60R 2021/23386
See application file for complete search history.

(56) References Cited

U.S. PATENT DOCUMENTS

| | | | |
|---|---|---|---|
| 11,390,235 B2 * | 7/2022 | Kim | ...................... B60R 21/233 |
| 2019/0061676 A1 * | 2/2019 | Kwon | ................. B60R 21/2338 |
| 2022/0176904 A1 | 6/2022 | Wheelwright et al. | |
| 2022/0355756 A1 * | 11/2022 | Azuma | ............... B60R 21/2338 |

FOREIGN PATENT DOCUMENTS

| | | |
|---|---|---|
| DE | 102020206551 A1 | 12/2021 |
| EP | 3838689 A1 | 2/2020 |
| WO | 2019-110705 A1 | 6/2019 |

OTHER PUBLICATIONS

Extended European Search Report dated Mar. 26, 2024, issued for the corresponding European patent application EP 23210496.8.

* cited by examiner

*Primary Examiner* — Karen Beck
(74) *Attorney, Agent, or Firm* — Novo TechIP International PLLC (57) ABSTRACT

A vehicle airbag includes a lower chamber that expands by gas generated from an inflator and expands from a driver's seat toward a passenger seat to fill a space between the driver's seat and the passenger seat; and an upper chamber that expands from the lower chamber at a side of the passenger seat to above the lower chamber and extends toward the driver's seat, wherein a central area surrounded by the lower chamber in the space between the driver's seat and the passenger seat includes an air pocket filled with air and is configured to absorb an impact applied to the lower chamber.

8 Claims, 6 Drawing Sheets

VEHICLE AIRBAG

CROSS-REFERENCE TO RELATED APPLICATIONS

This application claims priority to and the benefit of Korean Patent Application No. 10-2023-0074593, filed on Jun. 12, 2023, in the Korean Intellectual Property Office, the disclosure of which is incorporated herein by reference in its entirety for all purposes.

TECHNICAL FIELD

The present invention relates to a vehicle airbag, and more specifically, to a vehicle airbag disposed between a driver's seat and a passenger seat.

BACKGROUND

In general, when a car accident occurs, an airbag is designed to protect an occupant by rapidly expelling gas and rapidly inflating a deflated airbag in response to a signal from a collision sensor.

Among them, a side airbag is required to be designed to meet a standard required for oblique crashes according to North American New Car Assessment Program (NCAP).

In the case of a side or oblique crash, in order to protect occupants from colliding with the driver's seat and passenger seat or the driver's seat occupant form colliding with the vehicle's internal structure, the lateral movement of occupants should be restrained.

However, as the number of vehicles without a seat armrest and a center console has recently increased, a structural problem has arisen in which an airbag does not receive sufficient support and moves toward a seat next to the airbag, resulting in a problem of not protecting the occupant safely.

SUMMARY

The present invention is directed to providing a vehicle airbag that may safely protect an occupant in the event of a side or oblique crash.

The object of the present invention is not limited to the problems mentioned above, and other problems not mentioned will be clearly understood by those skilled in the art from the description below.

According to an aspect of the present invention, there is provided a vehicle airbag including a lower chamber installed on a side of a driver's seat and is configured to expand from a driver's seat toward a passenger seat to fill a space between the driver's seat and the passenger seat when deployed, and an upper chamber that expands upwardly from a side of the lower chamber proximate the passenger seat and includes an upper portion that extends toward the driver's seat, wherein the lower chamber surrounds a central area in the space between the driver's seat and the passenger seat that includes an air pocket filled with air and is configured to absorb an impact applied to the lower chamber.

The lower chamber may include a first lower portion disposed on a side of the driver's seat, a second lower portion disposed on a side of the passenger seat and a third lower portion disposed between the first lower portion and the second lower portion and connecting the first lower portion and the second lower portion.

The first lower portion may extend from the side of the driver's seat in a front-rear direction of a vehicle, the second lower portion may extend from the side of the passenger seat in the front-rear direction of the vehicle, the third lower portion may be connected to a rear end portion of the first lower portion and a rear end portion of the second lower portion.

The lower chamber may include a lower tether that is connected to an inner side of the first lower portion and an inner side of the second lower portion, and the lower tether may pull and restrain the first lower portion and the second lower portion so that the lower chamber maintains a "⊏"-shaped bent shape when inflated.

The first lower portion may be connected to an inflator mounted on the driver's seat.

The upper chamber may include a first upper portion that extends upwardly from the second lower portion and a second upper portion that and extends from an upper portion of the first upper portion towards the driver's seat.

The upper chamber may include an upper tether that is joined to an inner side of the first upper portion and an inner side of the second upper portion, and the upper tether may pull and restrain the first upper portion and the second upper portion so that the upper chamber maintains a bent shape when inflated.

The second upper portion may further include a third upper portion that is bent at an end portion of the second upper portion and extends downward, and the upper tether may be connected to the inner side of the first upper portion and an inner side of the third upper portion.

A gap between the first lower portion and the second lower portion may be adjusted by adjusting a length of the lower tether.

When deployed, the lower chamber may support the occupant's torso to restrain lateral movement, and the upper chamber may support and restrain the occupant's head.

Throughout the drawings and the detailed description, unless otherwise described or provided, the same, or like, drawing reference numerals may be understood to refer to the same, or like, elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Hereinafter, embodiments will be described in detail with reference to the accompanying drawings, but the same or corresponding components are assigned the same reference numbers even in different drawings and are not redundantly described herein.

Figure 1:
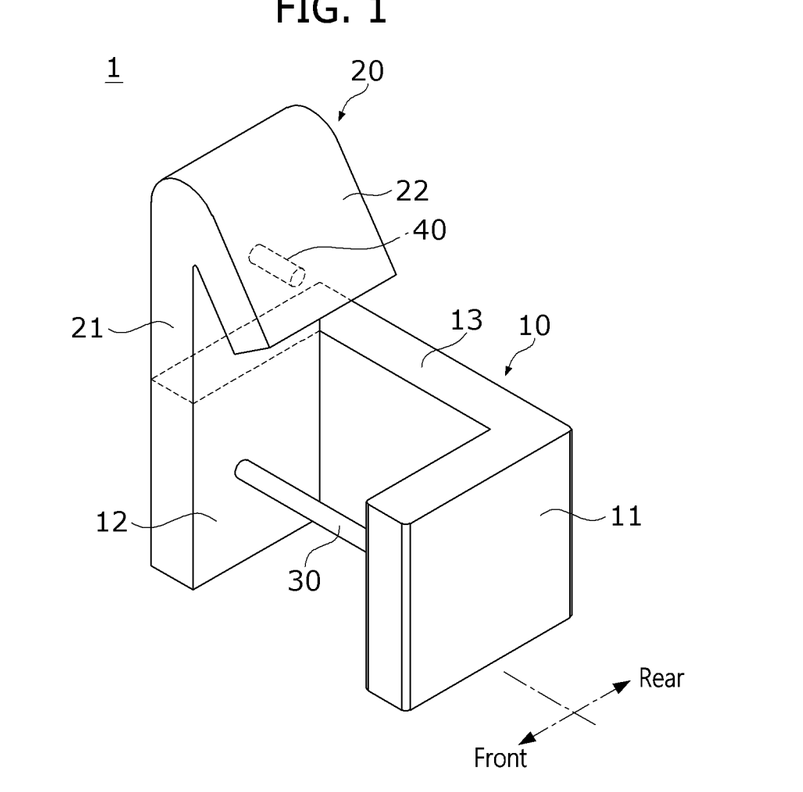
FIG. 1 is a schematic perspective view illustrating a vehicle airbag according to an embodiment of the present invention.
Figure 2:
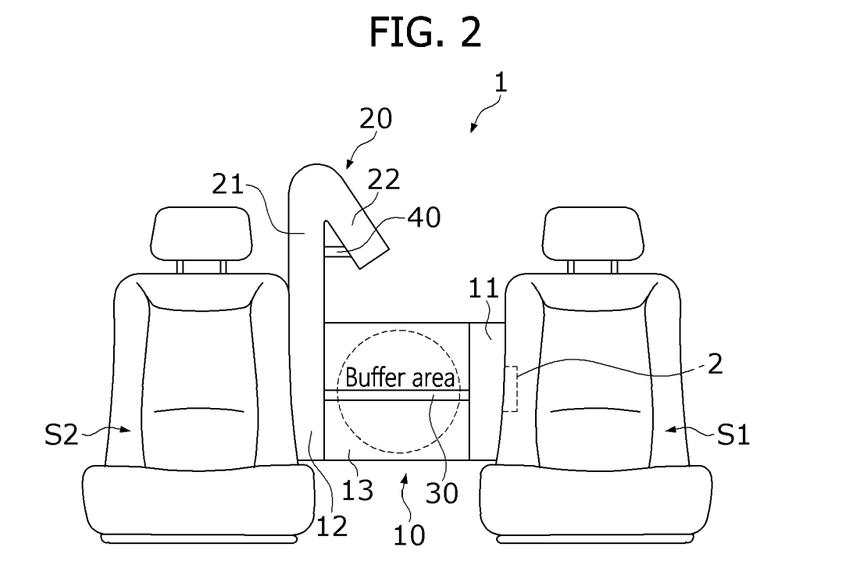
FIG. 2 is a schematic front view illustrating a state in which the vehicle airbag is disposed between a driver's seat and a passenger seat.
Figure 3:
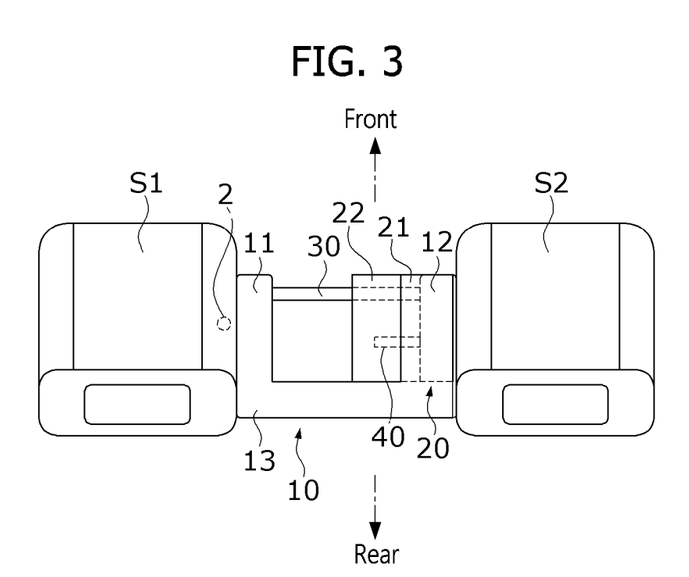
FIG. 3 is a schematic plan view illustrating a state in which the vehicle airbag is disposed between a driver's seat and a passenger seat.

FIG. 1 is a schematic perspective view illustrating a vehicle airbag according to an embodiment of the present invention, FIG. 2 is a schematic front view illustrating a state in which the vehicle airbag is disposed between a driver's seat and a passenger seat, and FIG. 3 is a schematic plan view illustrating the state in which the vehicle airbag is disposed between the driver's seat and the passenger seat.

A vehicle airbag 1 according to the embodiment of the present invention may be a center side airbag for protecting an occupant between a driver's seat S1 and a passenger seat S2. In the embodiment, the airbag 1 may be installed on a seatback side of the driver's seat S1.

Referring to the drawings, the vehicle airbag 1 according to the embodiment of the present invention may include a lower chamber 10 and an upper chamber 20.

The lower chamber 10 is expanded by the gas generated from an inflator 2 and may be deployed from the driver's seat S1 toward the passenger seat S2. Also, the lower chamber may be disposed to fill a space between the driver's seat S1 and the passenger seat S2.

The lower chamber 10 may include a first lower portion 11 disposed on a side of the driver's seat S1, a second lower portion 12 disposed on a side of the passenger seat S2, and a third lower portion 13 disposed between the first lower portion 11 and the second lower portion 12 and connecting the first lower portion 11 and the second lower portion 12.

The first lower portion 11 may be connected to the inflator 2 mounted on the driver's seat S1.

The first lower portion 11 extends from the side of the driver's seat S1 in a front-rear direction of a vehicle, and the second lower portion 12 extends in the front-rear direction of the vehicle from the side of the passenger seat S2. That is, the first lower portion 11 and the second lower portion 12 may extend approximately parallel to each other in a structure facing each other in the space between the driver's seat S1 and the passenger seat S2.

In addition, the third lower portion 13 may be connected to a rear end portion of the first lower portion 11 and a rear end portion of the second lower portion 12. That is, the third lower portion 13 can be arranged in a direction approximately perpendicular to the extension direction of the first lower portion 11 and the second lower portion 12.

Accordingly, the lower chamber 10 is expanded by gas, and the first lower portion 11, the second lower portion 12, and the third lower portion 13 may be deployed to form a structure bent in an approximate "⊏" shape.

In the embodiment, the third lower portion 13 is connected to a rear end portion of each of the first lower portion 11 and the second lower portion 12, but it is not limited thereto. In some embodiments, the third lower portion 13 may be connected to a front end portion of each of the first lower portion 11 and the second lower portion 12.

As shown in the drawing, the lower chamber 10 may be provided with a lower tether 30 that is joined and connected to the inner side of the first lower portion 11 and the inner side of the second lower portion 12. In the embodiment, the lower tether 30 may be connected to the lower chamber 10 through sewing.

The lower tether 30 may be disposed on the front end portion facing the third lower portion 13 between the first lower portion 11 and the second lower portion 12.

The lower tether 30 may pull and restrain the first lower portion 11 and the second lower portion 12 so that the lower chamber 10 maintains a "⊏"-shaped bent shape when the lower chamber is inflated. In addition, a gap between the first lower portion 11 and the second lower portion 12 may be adjusted by adjusting a length of the lower tether 30.

In the embodiment, the lower chamber 10 and the lower tether 30 may each be made of a flexible fabric material. Additionally, the lower chamber 10 and the lower tether 30 may each be made of a synthetic fiber material, but the material is not limited thereto.

In this way, the lower chamber 10 is disposed to fill the space between the driver's seat S1 and the passenger seat S2 when deployed, which supports an occupant's torso and restrains lateral movement, thereby collisions between occupants and injuries can be prevented.

In addition, as the lower chamber 10 has a "⊏"-shaped deployment structure, a central area surrounded by the lower chamber 10 in the space between the driver's seat S1 and the passenger seat S2 includes an air pocket filled with air and is configured to absorb an impact applied to the lower chamber 10.

In other words, the inner central area surrounded by the first lower portion 11, the second lower portion 12, and the third lower portion 13 opens to the front of a vehicle and forms a buffer area filled with air. Accordingly, an impact applied to the lower chamber by the occupants may be primarily absorbed by the lower chamber 10 and secondarily absorbed by the buffer area that constitutes the air pocket.

Meanwhile, the upper chamber 20 expands from the lower chamber 10 from the side of the passenger seat S2 to above the lower chamber 10 and may be deployed toward the driver's seat S1.

The upper chamber 20 may include a first upper portion 21 that is connected to the second lower portion 12 and extends upward from the second lower portion 12, and a second upper portion 22 that is bent from the first upper portion 21 and extends toward the driver's seat S1.

The first upper portion 21 extends from the side of the passenger seat S2 to the upper part of the vehicle in parallel with the second lower portion 12, and the second upper portion 22 may extend by bending from the end of the first upper portion 21 toward the driver's seat S1.

Accordingly, the upper chamber 20 is expanded by gas, and the first upper portion 21 and the second upper portion 22 may be deployed to form a structure bent in an approximate "λ" shape.

In the embodiment, the first upper portion 21 is connected to the second lower portion 12 and illustrated as extending from the second lower portion 12, but it is not limited thereto, and it is also possible to extend from the first lower portion 11. In this case, the second upper portion 22 may be bent and extended toward passenger seat S2.

As shown in the drawing, the upper chamber 20 may be provided with an upper tether 40 connected to the inner side of the first upper portion 21 and the inner side of the second upper portion 22. In the embodiment, the upper tether 40 may be connected to the upper chamber 20 through sewing.

The upper tether 40 may pull and restrain the first upper portion 21 and the second upper portion 22 so that the upper chamber 20 maintains a "λ"-shaped bent shape while the upper chamber 20 is inflated. In addition, a gap between the first upper portion 21 and the second upper portion 22 may be adjusted by adjusting a length of the upper tether 40.

In the embodiment, the upper chamber 20 and the upper tether 40 may each be made of a flexible fabric material. Additionally, the upper chamber 20 and the upper tether 40 may each be made of a synthetic fiber material, but the material is not limited thereto.

In this way, the upper chamber 20 disposed in the space between the driver's seat S1 and the passenger seat S2 supports an occupant's torso and restrains lateral movement when deployed, thereby collisions between occupants and injuries can be prevented.

Figure 4A:
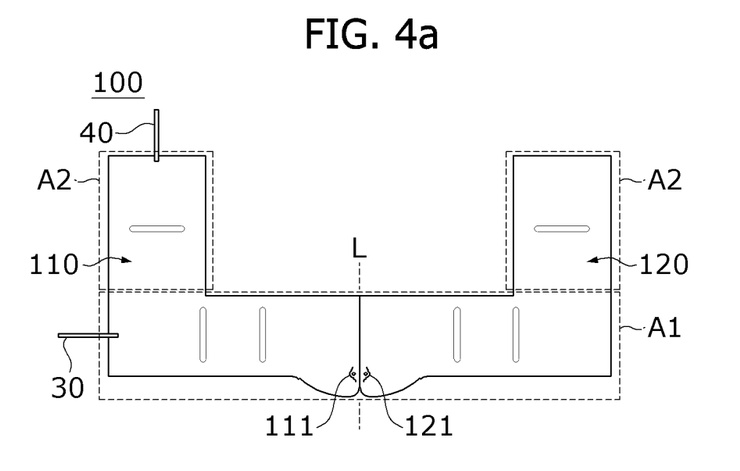
FIGS. 4A and 4B are schematic diagrams illustrating unfolded and folded states of panels constituting the vehicle airbag.
Figure 4B:
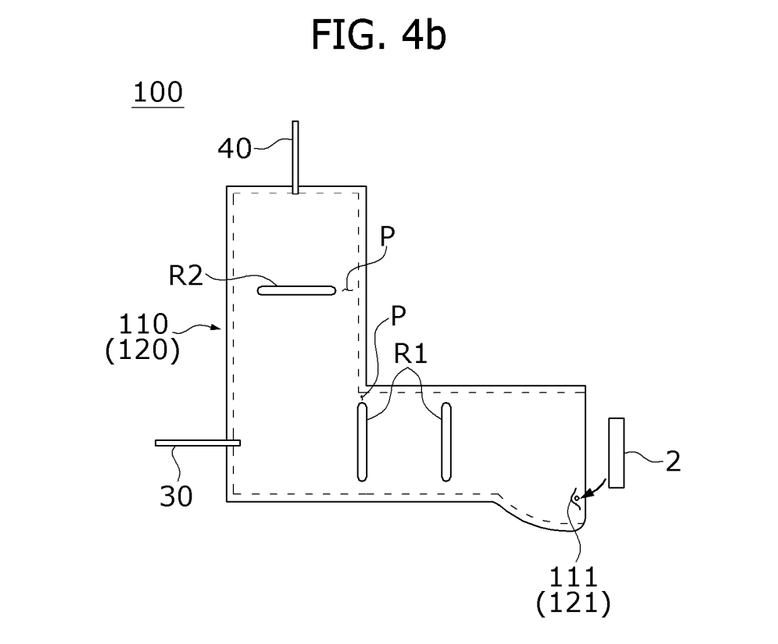

FIGS. 4A and 4B schematically show a panel 100 constituting the vehicle airbag 1 according to the embodiment.

Referring to the drawing, the panel 100 may have a structure in which a first panel 110 and a second panel 120 are connected in a left-right symmetrical manner based on a central fold line L.

In the embodiment, the first panel 110 and the second panel 120 may be cut into an approximate "L" shape with a horizontal section A1 and a vertical section A2. Then, in a state in which the first panel 110 and the second panel 120 are folded along the fold line L, the airbag 1 may be formed by sewing along the edges of the first panel 110 and the second panel 120.

The horizontal section A1 of the first panel 110 and the second panel 120 may constitute the lower chamber 10, and the vertical section A2 may constitute the upper chamber 20.

In a state in which the edges of the first panel 110 and the second panel 120 are joined, two first inactive areas R1 may be formed in the horizontal section A1. The first inactive area R1 may be formed by joining the first panel 110 and the second panel 120 in the vertical direction perpendicular to the horizontal section A1.

Additionally, at least one second inactive area R2 may be formed in the vertical section A2. The second inactive area R2 may be formed by joining the first panel 110 and the second panel 120 in a lateral direction perpendicular to the vertical section A2.

A passage P through which gas passes may be provided between the edge of the horizontal section A1 and the first inactive area R1 and provided between the edge of the vertical section A2 and the second inactive area R2.

In one side of the horizontal section A1 in the longitudinal direction, assembly holes 111 and 121 where inflator 2 is assembled are formed, and on the other side, one end of the lower tether 30 may be connected and fixed. In addition, one end of the upper tether 40 may be connected and fixed to the end of vertical section A2.

Figure 5A:
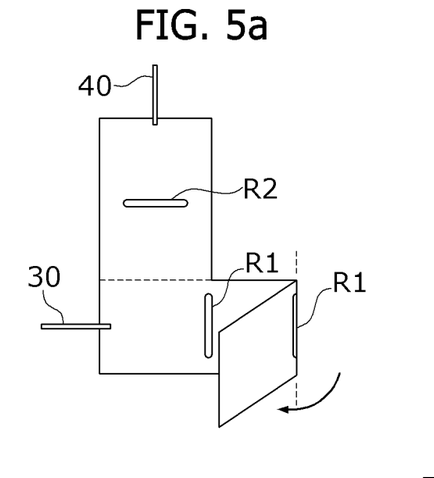
FIGS. 5A to 5C are schematic operation diagrams illustrating a process of completing an airbag through panels.
Figure 5B:
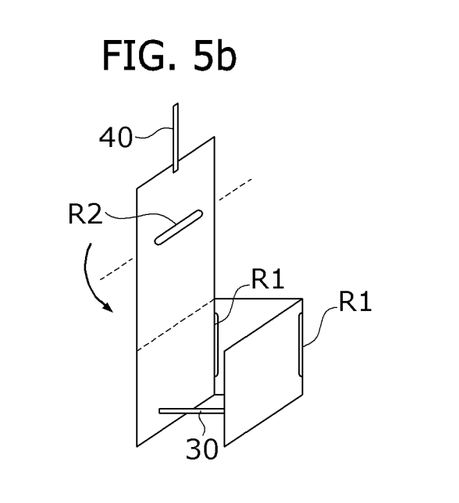

In the panel 100 provided in this way, as shown in FIGS. 5A and 5B, the horizontal section A1 is folded into a "L" shape based on the first inactive area R1, and the lower chamber 10 may be completed by connecting the other end of the lower tether 30.

Figure 5C:
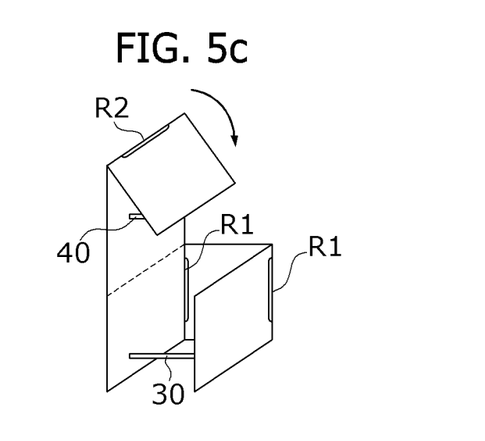

In addition, as shown in FIG. 5C, the vertical section A2 is folded into a "λ" shape based on the second inactive area R2, and the upper chamber 20 may be completed by connecting the other end of the upper tether 40.

Figure 6:
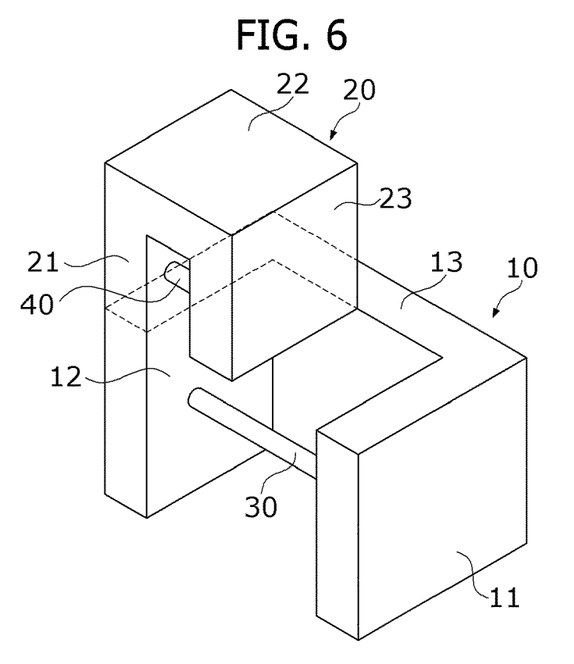
FIG. 6 is a schematic perspective view illustrating a modified example of an upper chamber in the vehicle airbag according to an embodiment of the present invention.
Figure 7:
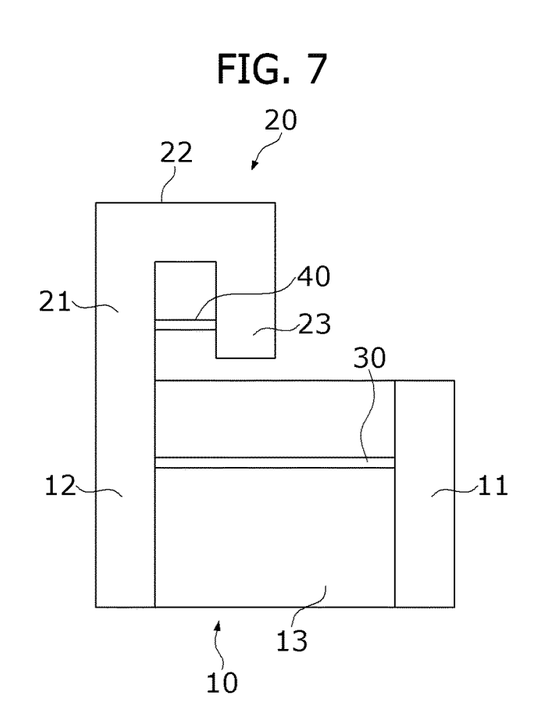
FIG. 7 is a schematic front view illustrating the vehicle airbag of FIG. 6.

FIGS. 6 and 7 schematically show a modified example of the upper chamber 20.

FIG. 6 is a schematic perspective view illustrating a modified example of an upper chamber in the vehicle airbag according to the embodiment of the present invention, and FIG. 7 is a schematic front view illustrating the vehicle airbag of FIG. 6.

As shown in the drawing, the upper chamber 20 may further include a third upper portion 23 that is bent at the end portion of the second upper portion 22 and extends downward.

Also, the upper tether 40 may be connected to the inner side of the first upper portion 21 and the inner side of the third upper portion 23. The upper tether 40 may pull and restrain the first upper portion 21 and the third upper portion 23 so that the upper chamber 20 maintains a "Ω"-shaped bent shape while the upper chamber 20 is inflated.

As described above, according to the embodiment of the present invention, injuries can be prevented by preventing occupants from colliding with each other through the lower chamber 10 and upper chamber 20 deployed in the space between the driver's seat S1 and the passenger seat S2.

In particular, in the case where an occupant is on only one of the driver's seat S1 and the passenger seat S2, since the lower chamber 10 is arranged to fill the space between the driver's seat S1 and the passenger seat S2 when deployed, it is possible to prevent the airbag 1 from falling into the passenger seat S2 due to an impact from the occupant in the driver's seat S1, or the airbag 1 from falling into the driver's seat S1 due to an impact from the occupant in the passenger seat S2. Accordingly, the driver's seat S1 occupant or the passenger seat S2 occupant can be protected more effectively.

In addition, even when impacts are applied simultaneously from the occupant in the driver's seat S1 and the occupant in the passenger seat S2, since the lower chamber 10 can be stably fixed while maintaining its deployed state, the problem of the conventional side airbag rotating and causing a collision between occupants does not occur.

In addition, since the lower chamber 10 and the upper chamber 20 are configured to be integrally connected by a panel 100 having a single structure, the overall structure is simple, therefore the problem of abnormal deployment of the airbag does not occur, and the manufacturing process is simple, thereby providing the effect of improving productivity.

According to an embodiment of the present invention, it is possible to provide a vehicle airbag that can safely protect occupants in the event of a side or oblique crash.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A vehicle airbag comprising:
a lower chamber configured to be installed on a side of a driver's seat and expand from the driver's seat toward a passenger's seat to fill a space between the driver's seat and the passenger's seat when deployed; and
an upper chamber configured to expand upwardly from a side of the lower chamber proximate the passenger's seat to above the lower chamber and including a portion that extends from an upper portion of the upper chamber toward the driver's seat,
wherein the lower chamber surrounds a central area in the space between the driver's seat and the passenger's seat that includes an air pocket filled with air and is configured to absorb an impact applied to the lower chamber,
wherein the lower chamber includes:
a first lower portion disposed on a side of the driver's seat;
a second lower portion disposed on a side of the passenger's seat; and
a third lower portion extending between and connecting the first lower portion and the second lower portion, and
wherein:
the first lower portion extends in a front-rear direction of a vehicle;
the second lower portion extends in the front-rear direction of the vehicle; and
the third lower portion is connected to a rear end portion of the first lower portion and a rear end portion of the second lower portion.

2. The vehicle airbag of claim 1, wherein:
the lower chamber includes a lower tether that extends between and is connected to an inner side of the first lower portion and an inner side of the second lower portion; and
the lower tether restrains the first lower portion and the second lower portion so that the lower chamber maintains a "⊏" shape when the lower chamber is inflated.

3. The vehicle airbag of claim 1, wherein the first lower portion is connected to an inflator mounted on the driver's seat.

4. A vehicle airbag comprising:
a lower chamber configured to be installed on a side of a driver's seat and expand from the driver's seat toward a passenger's seat to fill a space between the driver's seat and the passenger's seat when deployed; and
an upper chamber configured to expand upwardly from a side of the lower chamber proximate the passenger's seat to above the lower chamber and including a portion that extends from an upper portion of the upper chamber toward the driver's seat,
wherein the lower chamber surrounds a central area in the space between the driver's seat and the passenger's seat that includes an air pocket filled with air and is configured to absorb an impact applied to the lower chamber,
wherein the upper chamber includes:
a first upper portion that is connected to the second lower portion and extending upwardly from the second lower portion; and
a second upper portion extending from the first upper portion towards the driver's seat.

5. The vehicle airbag of claim 4, wherein:

the upper chamber includes an upper tether joined to an inner side of the first upper portion and an inner side of the second upper portion; and the upper tether restrains the first upper portion and the second upper portion so that the upper chamber maintains a bent shape when inflated.

6. The vehicle airbag of claim 5, wherein:

the second upper portion includes a third upper portion extending downwardly from an end portion of the second upper portion; and the upper tether is connected to the inner side of the first upper portion and an inner side of the third upper portion.

7. The vehicle airbag of claim 2, wherein a gap between the first lower portion and the second lower portion is adjustable by adjusting a length of the lower tether.

8. The vehicle airbag of claim 1, wherein, when deployed, the lower chamber supports an occupant's torso to restrain lateral movement thereof, and the upper chamber supports and restrains the occupant's head.

\* \* \* \* \*